US012421911B2

(12) United States Patent
Ikeda et al.

(10) Patent No.: US 12,421,911 B2
(45) Date of Patent: Sep. 23, 2025

(54) CONTROLLER FOR INTERNAL COMBUSTION ENGINE AND METHOD FOR CONTROLLING INTERNAL COMBUSTION ENGINE

(71) Applicant: TOYOTA JIDOSHA KABUSHIKI KAISHA, Toyota (JP)

(72) Inventors: Yuto Ikeda, Okazaki (JP); Satoshi Ido, Toyota (JP); Makoto Yamazaki, Gotenba (JP); Katsuhiro Ito, Nagoya (JP); Koji Umezawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/827,947

(22) Filed: Sep. 9, 2024

(65) Prior Publication Data

US 2025/0109720 A1 Apr. 3, 2025

(30) Foreign Application Priority Data

Oct. 3, 2023 (JP) ................................ 2023-171980

(51) Int. Cl.
*F02D 19/02* (2006.01)
*F02D 41/00* (2006.01)
*F02D 41/14* (2006.01)
*F02D 41/40* (2006.01)

(52) U.S. Cl.
CPC ......... *F02D 41/40* (2013.01); *F02D 41/0007* (2013.01); *F02D 41/0027* (2013.01); *F02D 41/146* (2013.01); *F02D 2200/0411* (2013.01); *F02D 2200/1002* (2013.01)

(58) Field of Classification Search
CPC ..... Y02T 90/40; F02D 41/40; F02D 41/0027; F02D 41/30; F02D 41/2454; F02D 41/0052; F02D 2200/0406; F02D 2200/0402; F02D 2200/04; F02D 2200/1002; F02D 2200/1004; F02D 2200/08; F02D 2200/0806; F02D 2200/0808;
(Continued)

(56) References Cited

U.S. PATENT DOCUMENTS

2013/0017121 A1* 1/2013 Bisaiji .................. F01N 3/2073
422/111

FOREIGN PATENT DOCUMENTS

| | | | |
|---|---|---|---|
| CN | 115898712 A * | 4/2003 | |
| JP | 2002-021616 A | 1/2002 | |
| JP | 2005-220833 A | 8/2005 | |

* cited by examiner

*Primary Examiner* — Lindsay M Low
*Assistant Examiner* — Teuta B Holbrook
(74) *Attorney, Agent, or Firm* — Oblon, McClelland, Maier &Neustadt, L.L.P.

(57) ABSTRACT

A controller and a control method for an internal combustion engine are provided. The internal combustion engine uses hydrogen as fuel. A base value of a fuel injection amount is calculated based on a requested torque. A smaller one of an upper limit value of the fuel injection amount and the base value is set as a target value. The upper limit value corresponds to an engine load factor. A NOx concentration difference is a difference between a NOx concentration in exhaust gas and a reference value for the NOx concentration. When the NOx concentration difference is greater than or equal to a threshold value, a relationship between the engine load factor and the upper limit value is corrected such that the upper limit value decreases.

6 Claims, 4 Drawing Sheets

(58) Field of Classification Search
CPC . F02D 2200/0811; F02B 43/10; G01M 15/10; G01M 15/102
USPC ....... 123/406.44, 406.41; 73/114.37, 114.33, 73/114.71, 114.69, 114.72; 701/103, 104, 701/102
See application file for complete search history.

CONTROLLER FOR INTERNAL COMBUSTION ENGINE AND METHOD FOR CONTROLLING INTERNAL COMBUSTION ENGINE

CROSS-REFERENCE TO RELATED APPLICATIONS

This application is based upon and claims the benefit of priority from prior Japanese Patent Application No. 2023-171980, filed on Oct. 3, 2023, the entire contents of which are incorporated herein by reference.

BACKGROUND

1. Field

The present disclosure relates to a controller for an internal combustion engine and a method for controlling an internal combustion engine. The controller and control method are employed in internal combustion engines that use hydrogen as fuel.

2. Description of Related Art

Japanese Laid-Open Patent Publication No. 2005-220833 discloses a controller that corrects the fuel injection amount of a fuel injection valve based on the detected value of an air-fuel ratio sensor.

In recent years, the development of internal combustion engines that use hydrogen as fuel has been progressing. In hydrogen-fueled internal combustion engines, the accuracy of correcting the fuel injection amount based on the detected value of the air-fuel ratio sensor may tend to be lower. Additionally, in hydrogen-fueled internal combustion engines, the degree of changes in the NOx concentration in exhaust gas in response to changes in the actual air-fuel ratio is relatively large. In other words, in internal combustion engines that use hydrogen as fuel, changes in the actual air-fuel ratio that increase fuel richness have a significant impact on exhaust gas properties.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for an internal combustion engine. The controller includes processing circuitry employed in the internal combustion engine using hydrogen as fuel. The internal combustion engine including a fuel injection valve. The processing circuitry is configured to execute operations to control the fuel injection amount of the fuel injection valve. The operations include calculating, based on a requested torque of the internal combustion engine, a base value of the fuel injection amount. The requested torque is a requested value of torque for the internal combustion engine. The operations include setting a smaller one of the base value and an upper limit value of the fuel injection amount as a target value of the fuel injection amount. The upper limit value corresponds to an engine load factor of the internal combustion engine. The operations include actuating the fuel injection valve based on the target value. The operations include obtaining a NOx concentration difference between a NOx concentration in exhaust gas of the internal combustion engine and a reference value for the NOx concentration. The operations include correcting, when the NOx concentration difference is greater than or equal to a concentration difference threshold value, a relationship between the engine load factor and the upper limit value such that the upper limit value decreases.

Another aspect of the present disclosure provides a method for controlling an internal combustion engine including the same processes as the controller for the internal combustion engine.

The controller or control method for the above internal combustion engine limits the deterioration of exhaust gas properties.

This Summary is provided to introduce a selection of concepts in a simplified form that are further described below in the Detailed Description. This Summary is not intended to identify key characteristics or essential characteristics of the claimed subject matter, nor is it intended to be used as an aid in determining the scope of the claimed subject matter.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller for an internal combustion engine and a method for controlling an internal combustion engine according to an embodiment will now be described with reference to FIGS. 1 to 5.

Figure 1:
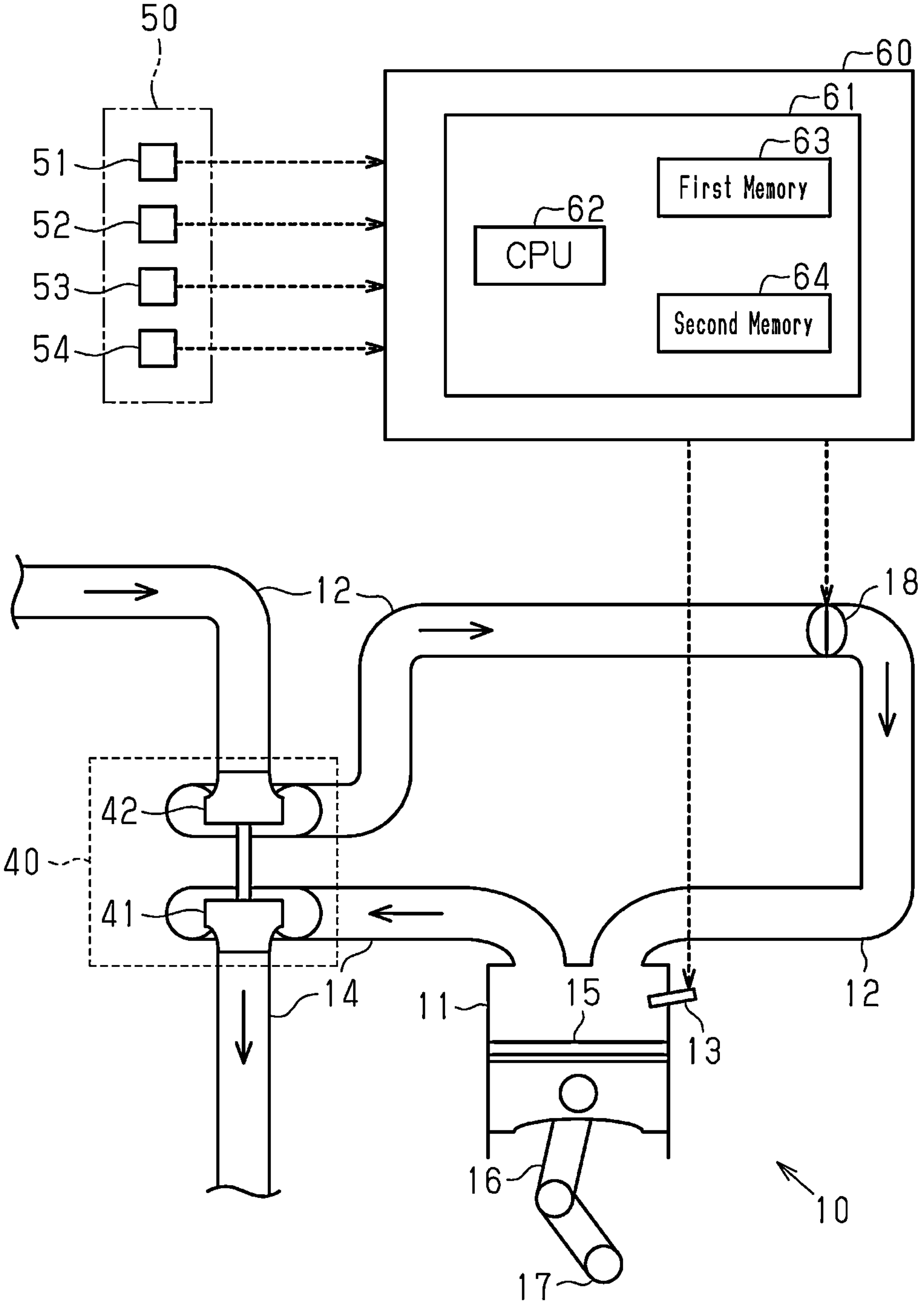
FIG. 1 is a diagram showing the configuration of a controller that is an embodiment of a controller for an internal combustion engine and the configuration of an internal combustion engine in which the controller is employed.

FIG. 1 shows an internal combustion engine 10 mounted on a vehicle, a detection system 50 for the internal combustion engine 10, and a controller 60 employed in the internal combustion engine 10. The controller 60 corresponds to the controller for the internal combustion engine. The controller 60 executes the method for controlling the internal combustion engine.

Internal Combustion Engine

The internal combustion engine 10 is a hydrogen engine that uses hydrogen as fuel. The internal combustion engine 10 includes cylinders 11, an intake passage 12, fuel injection valves 13, and an exhaust passage 14. FIG. 1 shows one of the cylinders 11. The cylinders 11 each accommodate a piston 15. The pistons 15 are coupled to a crankshaft 17 by connecting rods 16. The crankshaft 17 rotates as the piston 15 reciprocates within each of the cylinders 11.

The intake passage 12 is connected to the cylinders 11. The intake passage 12 is a passage through which air drawn into the cylinders 11 flows. The intake passage 12 includes a throttle valve 18 that regulates the amount of air drawn into the cylinders 11.

Each fuel injection valves 13 injects hydrogen into a corresponding cylinder 11. In the example shown in FIG. 1, the fuel injection valve 13 is depicted as a direct injection valve that directly injects fuel into the cylinder 11. The internal combustion engine 10 may include a port injection valve at a portion of the intake passage 12 downstream of the throttle valve 18, for injecting hydrogen as the fuel injection valve 13.

In each of the cylinders 11, the air-fuel mixture containing air and hydrogen is burned by the spark discharge from an ignition plug (not shown). Exhaust gas is thus generated within each of the cylinders 11. The exhaust gas is emitted from the cylinders 11 into the exhaust passage 14. Then, exhaust gas flows through the exhaust passage 14.

The internal combustion engine 10 includes and an exhaust-driven forced-induction device 40. The forced-induction device 40 includes a turbine 41 arranged in the exhaust passage 14 and a compressor 42 arranged in the intake passage 12. The turbine 41 operates based on the flow dynamics of exhaust gas passing through the exhaust passage 14. The compressor 42 is positioned in the portion of the intake passage 12 that is upstream of the throttle valve 18. The compressor 42 operates in synchronization with the turbine 41, thereby pressurizing the air flowing through the intake passage 12.

Detection System for Internal Combustion Engine

The detection system 50 includes sensors that output signals respectively corresponding to the detection results to the controller 60. The sensors include, for example, an accelerator pedal position sensor 51, a crank angle sensor 52, an air flow meter 53, and a NOx sensor 54. The accelerator pedal position sensor 51 detects the operation amount of the accelerator pedal by the vehicle driver. The crank angle sensor 52 outputs a signal corresponding to the rotation speed of the crankshaft 17. The air flow meter 53 detects the amount of air flowing through the portion of the intake passage 12 that is upstream of the compressor 42. The NOx sensor 54 detects the concentration of NOx in the exhaust gas flowing through the exhaust passage 14.

In the present embodiment, the operation amount of the accelerator pedal based on the detection signal from the accelerator pedal position sensor 51 is referred to as an accelerator pedal position AC. The rotation speed of the crankshaft 17 based on the detection signal from the crank angle sensor 52 is referred to as an engine rotation speed NE. The flow rate of air based on the detection signal from the air flow meter 53 is referred to as an intake air amount GA. The concentration of NOx in exhaust gas based on the detection signal from the NOx sensor 54 is referred to as an actual NOx concentration FN.

Controller

The controller 60 includes processing circuitry 61. One example of the processing circuitry 61 is an electronic controller. In this case, the processing circuitry 61 includes a CPU 62, a first memory 63, and a second memory 64. The first memory 63 stores various control programs executed by the CPU 62. The second memory 64 stores calculation results of the CPU 62. The processing circuitry 61 controls the running of the internal combustion engine 10 by adjusting a throttle open degree SL, which indicates the open degree of the throttle valve 18, and fuel injection amounts QF of multiple fuel injection valves 13, by the CPU 62 executing the control programs.

Processing Contents of Processing Circuitry

The processes executed by the processing circuitry 61 will be described with reference to FIGS. 2 to 4.

Figure 2:
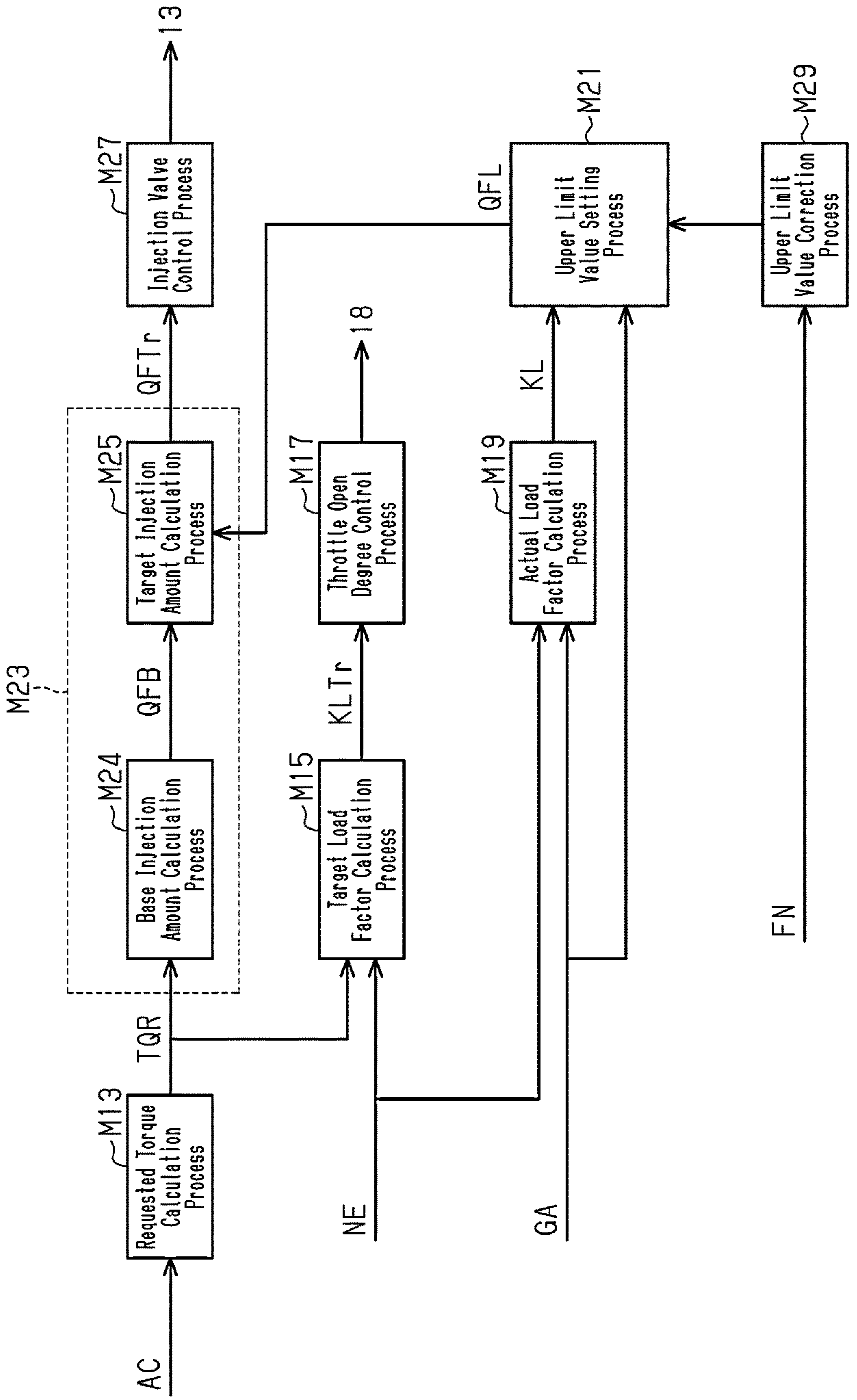
FIG. 2 is a block diagram illustrating processes executed by the controller shown in FIG. 1.

As shown in FIG. 2, the CPU 62 executes the control programs so that the processing circuitry 61 performs the processes for controlling the operation of the internal combustion engine 10. The processes include a requested torque calculation process M13, a target load factor calculation process M15, a throttle open degree control process M17, an actual load factor calculation process M19, an upper limit value setting process M21, an injection amount determination process M23, a fuel injection valve control process M27, and an upper limit value correction process M29.

The processing circuitry 61 calculates a requested torque TQR, which is a requested value of an engine torque TQ, in the requested torque calculation process M13. For example, the processing circuitry 61 calculates the requested torque TQR such that the requested torque TQR increases as the accelerator pedal position AC increases. The engine torque TQ is an output torque of the internal combustion engine 10.

The processing circuitry 61 calculates a target load factor KLTr, which is the target value of the engine load factor, in the target load factor calculation process M15. The engine load factor is a load factor of the internal combustion engine 10. The engine load factor represents the ratio of the current cylinder inflow air amount to the cylinder inflow air amount when the internal combustion engine 10 is steadily operated in a full load state. The cylinder inflow air amount is the amount of air flows into each cylinder 11 in the intake stroke.

For example, in the target load factor calculation process M15, the processing circuitry 61 calculates the target load factor KLTr based on the engine rotation speed NE and the requested torque TQR. In this case, the processing circuitry 61 should calculate the target load factor KLTr such that the value of the target load factor KLTr increases as the engine rotation speed NE becomes higher. Additionally, the processing circuitry 61 should calculate the target load factor KLTr such that the value of the target load factor KLTr increases as the requested torque TQR becomes larger.

The processing circuitry 61 calculates a throttle open degree command value, which is a command value for the throttle open degree SL, in the throttle open degree control process M17. For example, the processing circuitry 61 calculates the throttle open degree command value such that the throttle open degree command value becomes larger as the target load factor KLTr increases. The processing circuitry 61 operates the throttle valve 18 such that the throttle open degree SL matches the throttle open degree command value.

The processing circuitry 61 calculates the actual load factor KL, which serves as the engine load factor, in the actual load factor calculation process M19. In other words, the actual load factor KL indicates the actual value of the engine load factor. The processing circuitry 61 calculates the actual load factor KL based on the engine rotation speed NE and the intake air amount GA. For example, the processing circuitry 61 calculates the actual load factor KL such that the value of the actual load factor KL increases as the engine rotation speed NE increases. For example, the processing circuitry 61 calculates the actual load factor KL such that the value of the actual load factor KL increases as the intake air amount GA increases.

The processing circuitry 61 sets the upper injection amount QFL as the upper limit value for the fuel injection amount in the upper limit value setting process M21. The processing circuitry 61 sets an upper limit injection amount QFL based on the actual load factor KL.

Figure 3:
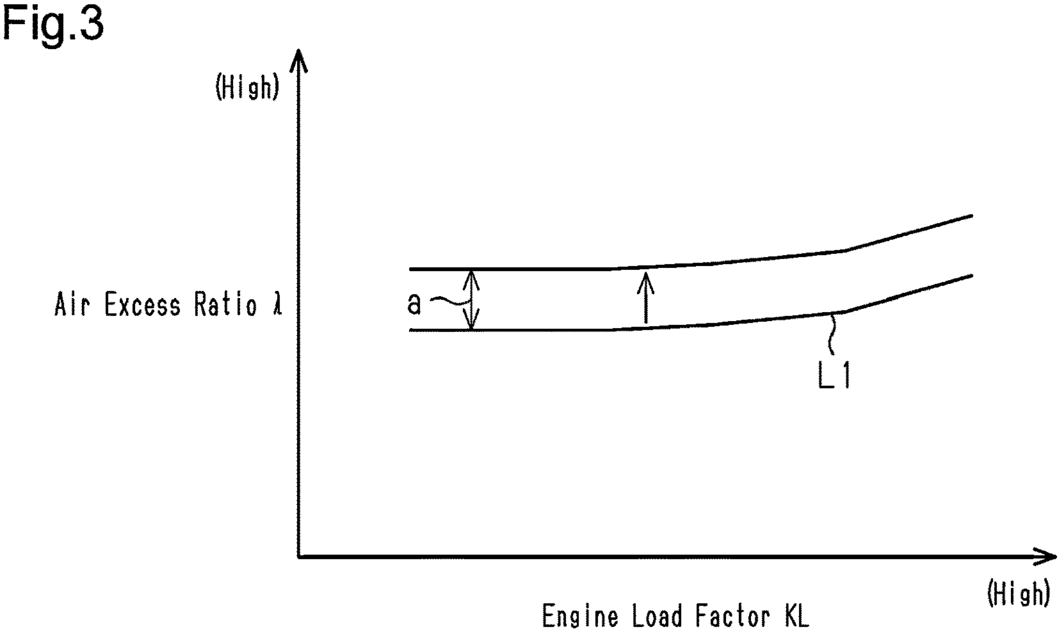
FIG. 3 is a load factor map illustrating the relationship between the engine load factor and the air excess ratio of the internal combustion engine shown in FIG. 1.
Figure 4:
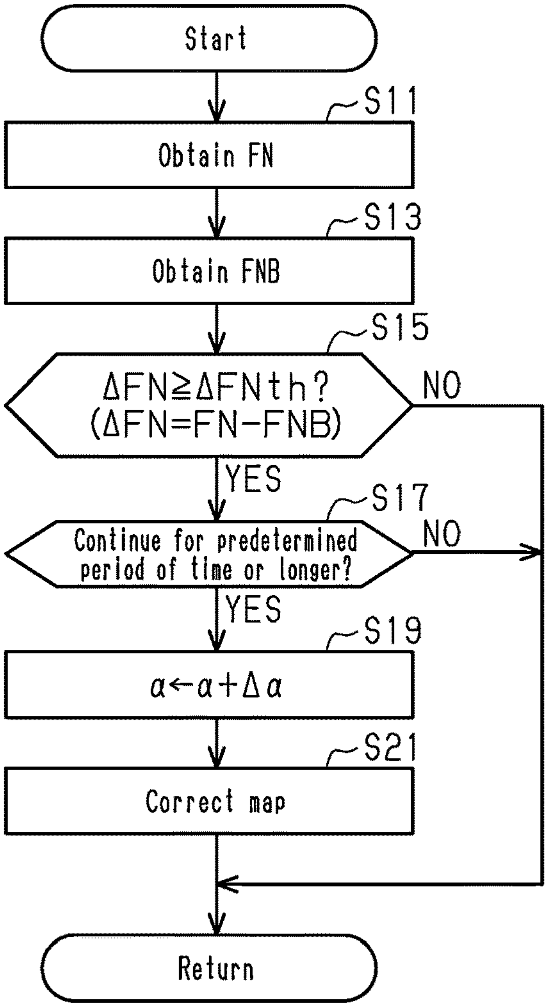
FIG. 4 is a flowchart illustrating the upper limit value correction process shown in FIG. 2.

FIG. 3 illustrates an example of a load factor map that is referred to when setting the upper limit injection amount QFL. The load factor map in FIG. 3 illustrates the relationship between the actual load factor KL and the air excess ratio λ. The air excess ratio λ is equal to the value obtained by dividing the actual air-fuel ratio by the stoichiometric air-fuel ratio. When the actual air-fuel ratio matches the stoichiometric air-fuel ratio, the air excess ratio λ is 1. When the air excess ratio λ is greater than 1, it indicates that the actual air-fuel ratio is leaner than the stoichiometric air-fuel ratio.

The processing circuitry 61 obtains the air excess ratio λ corresponding to the current actual load factor KL from the above-described load factor map. The processing circuitry 61 calculates the upper injection amount QFL based on the intake air amount GA and the air excess ratio λ. For example, the processing circuitry 61 calculates the fuel injection amount based on the intake air amount GA such that the actual air excess ratio is equal to the air excess ratio λ. The calculated fuel injection amount is the upper limit injection amount QFL.

The processing circuitry 61 determines a target injection amount QFTr, which is the target of the fuel injection amount QF, in the injection amount determination process M23. The injection amount determination process M23 includes a base injection amount calculation process M24 and a target injection amount calculation process M25.

The processing circuitry 61 calculates the base injection amount QFB, which is a base value of the fuel injection amount QF, in the base injection amount calculation process M24. The processing circuitry 61 calculates the base injection amount QFB such that the value of the base injection amount QFB increases as the requested torque TQR becomes larger.

The processing circuitry 61 calculates the target injection amount QFTr in the target injection amount calculation process M25. The processing circuitry 61 sets the smaller one of the base injection amount QFB and the upper limit injection amount QFL as the target injection amount QFTr.

The processing circuitry 61 controls multiple fuel injection valves 13 based on the target injection amount QFTr in the injection valve control process M27. The processing circuitry 61 increases the time of energizing the solenoid of each fuel injection valve 13 as the target injection amount QFTr becomes larger.

The processing circuitry 61 changes the upper limit injection amount QFL in the upper limit value correction process M29. Specifically, the processing circuitry 61 changes the load factor map shown in FIG. 3, i.e., the relationship between the actual load factor KL and the air excess ratio λ.

The upper limit value correction process M29 will now be described with reference to FIG. 4. The processing circuitry 61 repeatedly executes the upper limit value correction process M29 at predetermined cycles.

In step S11, the processing circuitry 61 acquires the actual NOx concentration FN.

In the next step S13, the processing circuitry 61 acquires a reference concentration FNB, which is the reference value of the NOx concentration. The reference concentration FNB is a NOx concentration set based on the various factors or elements of the internal combustion engine 10. The value of the reference concentration FNB is set so as to determine, using the reference concentration FNB, that the exhaust gas properties of the internal combustion engine 10 have deteriorated based on the deviation of the actual NOx concentration FN from the reference concentration FNB. The reference concentration FNB varies according to the actual load factor KL. Therefore, the processing circuitry 61 obtains the reference concentration FNB corresponding to the current actual load factor KL.

In the subsequent Step S15, the processing circuitry 61 determines whether the NOx concentration difference ΔFN is greater than or equal to a concentration difference threshold value ΔFNth. The NOx concentration difference ΔFN is the value obtained by subtracting the reference concentration FNB from the actual NOx concentration FN. The concentration difference threshold value ΔFNth is set as the reference for determining whether a change in the load factor map is necessary. When the NOx concentration difference ΔFN is greater than or equal to the concentration difference threshold value ΔFNth, the exhaust gas properties may deteriorate and thus the load factor map should be changed. When the NOx concentration difference ΔFN is less than the concentration difference threshold value ΔFNth, the load factor map does not need to be changed. When the NOx concentration difference ΔFN is greater than or equal to the threshold value concentration difference ΔFNth (S15: YES), the processing circuitry 61 advances the process to step S17. When the NOx concentration difference ΔFN is less than the concentration difference threshold value ΔFNth (S15: NO), the processing circuitry 61 temporarily ends the upper limit value correction process M29 without changing the load factor map.

In step S17, the processing circuitry 61 determines whether a concentration deviation duration is greater than or equal to a predetermined period of time. The concentration deviation duration is the duration during which the NOx concentration difference ΔFN remains greater than or equal to the concentration difference threshold value ΔFNth. The predetermined period of time is set so as to serve as the reference for determining whether the actual NOx concentration FN actually deviates from the reference concentration FNB. When the concentration deviation duration is greater than or equal to the predetermined period of time, the actual NOx concentration FN actually deviates from the reference concentration FNB. When the concentration deviation duration is less than the predetermined period of time, there is a possibility that the actual NOx concentration FN does not deviate from the reference concentration FNB in reality. When determining that the concentration deviation duration is greater than or equal to the predetermined period of time (S17: YES), the processing circuitry 61 advances the process to step S19. When determining that the concentration deviation duration is less than the predetermined period of time (S17: NO), the processing circuitry 61 temporarily ends the upper limit value correction process M29 without changing the load factor map.

In step S19, the processing circuitry 61 updates a map correction coefficient α, which is used to correct the load factor map. For example, the processing circuitry 61 calculates the sum of the map correction coefficient α and an offset value Δα to obtain the latest value of the map correction coefficient α.

In the subsequent step S21, the processing circuitry 61 corrects the load factor map using the map correction coefficient α. Specifically, the processing circuitry 61 shifts the line indicating the load factor map, in the graph shown in FIG. 3, in the direction of increasing the air excess ratio λ. For example, FIG. 3 shows line L1 indicating the load factor map that has been set based on the various factors or elements of the internal combustion engine 10. In this case, as indicated by the arrow in FIG. 3, the processing circuitry 61 shifts line L1, which indicates the load factor map, by the map correction coefficient α to increase the air excess ratio λ. Upon correcting the load factor map in this manner, the processing circuitry 61 temporarily ends the upper limit value correction process M29.

Operation and Advantages of Present Embodiment

The operation of the present embodiment will now be now described with reference to FIG. 5. Section (A) of FIG. 5 indicates changes in the engine torque TQ. In section (B) of FIG. 5, the solid line indicates changes in the target load factor KLTr, whereas the broken line indicates changes in the actual load factor KL. In section (C) of FIG. 5, the solid line indicates changes in the target injection amount QFTr, while the broken line indicates changes in the base injection amount QFB. In section (D) of FIG. 5, the solid line indicates changes in an actual air excess ratio λS, which is the actual value of the air excess ratio λ, while the broken line indicates changes in a target air excess ratio λTr, which is the target value of the air excess ratio λ. The long dashed double-short dashed line indicates changes in the air excess ratio λa in a comparative example. In section (E) of FIG. 5, the solid line indicates changes in the actual NOx concentration FN, while the long dashed double-short dashed line indicates changes in an actual NOx concentration FNa in the comparative example.

In the comparative example, the upper injection amount QFL is not set. Instead, the target injection amount QFTr is set.

Figure 5:
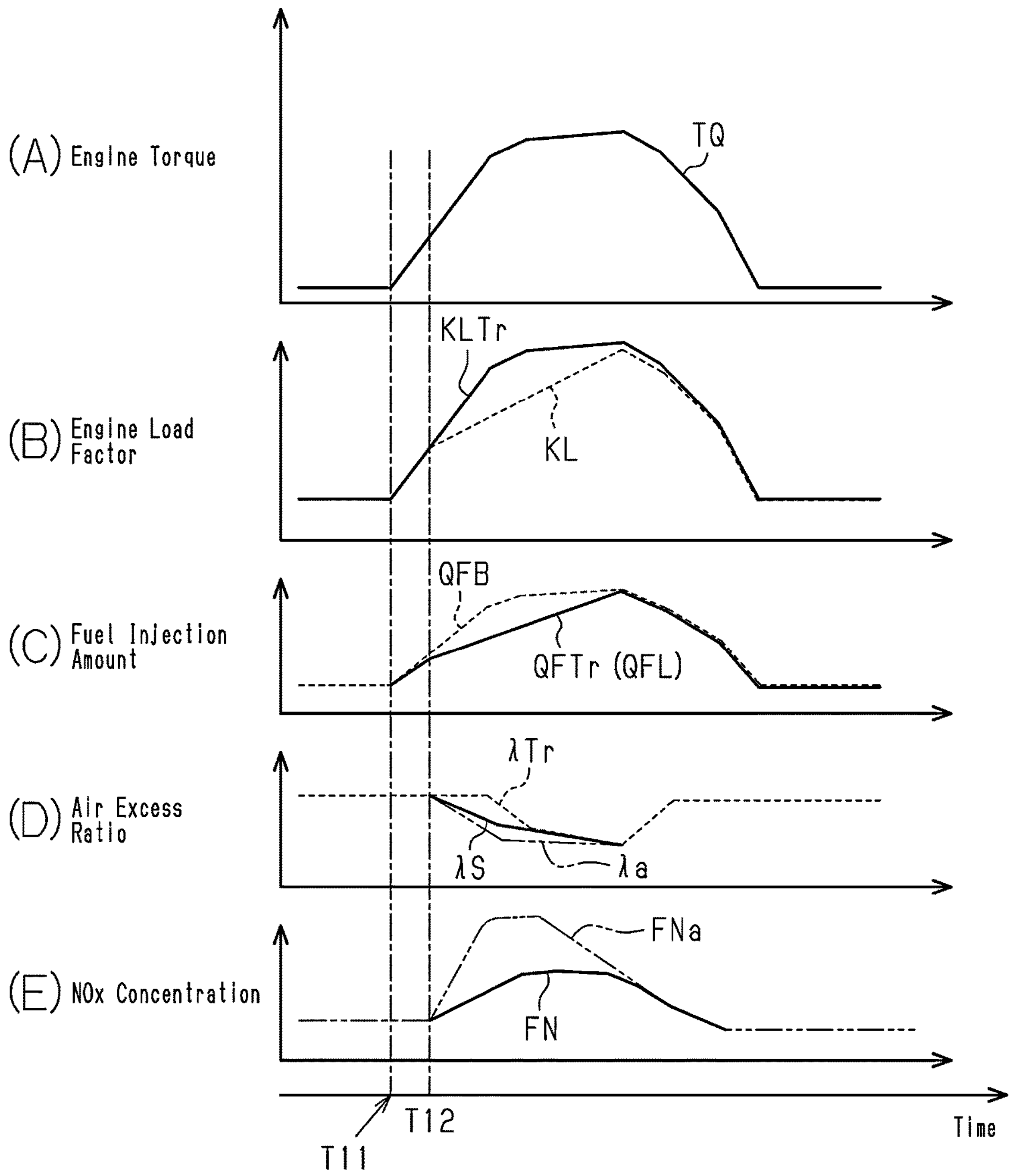
FIG. 5 is a timing diagram during the operation of the internal combustion engine shown in FIG. 1.

At time T11 during the steady-state operation, the engine torque TQ begins to increase (see section (A) in FIG. 5). As a result, the actual load factor KL also increases (see section (B) of FIG. 5). When the actual load factor KL increases, the target injection amount QFTr becomes larger (see section (C) of FIG. 5).

Thus, when the actual load factor KL increases, the boost pressure generated by the forced-induction device 40 begins to rise. However, as indicated from time T12 onwards, due to the response delay of the boost pressure of the forced-induction device 40, the actual load factor KL starts to deviate from the target load factor KLTr (see section (B) of FIG. 5).

In the comparative example, the upper limit injection amount QFL is not set. In this case, the base injection amount QFB is set as the target injection amount QFTr (see section (C) of FIG. 5). The base injection amount QFB is a fuel injection amount based on the requested torque TQR. Thus, in the comparative example, the fuel injection amount QF may be excessive relative to the intake air amount GA. As a result, as shown by the long dashed double-short dashed line in section (D) of FIG. 5, the air excess ratio λa changes so as to increase the fuel richness. Specifically, the air excess ratio λa decreases. The actual air-fuel ratio changes so as to increase the fuel richness. When the air excess ratio λa changes so as to increase the fuel richness, the actual NOx concentration FNa in exhaust gas suddenly increases as indicated by the long dashed double-short dashed line in section (E) of FIG. 5.

In the present embodiment, the upper limit injection amount QFL is set. As shown in section (C) of FIG. 5, when the base injection amount QFB exceeds the upper limit injection amount QFL, the target injection amount QFTr is set to the upper limit injection amount QFL as indicated by the solid line. This limits situations in which the actual air excess ratio λS changes so as to increase the fuel richness as shown in section (D) of FIG. 5. In other words, the actual air excess ratio λS is less likely to deviate from the target air excess ratio λTr than the air excess ratio λa indicated by the long dashed double-short dashed line. Consequently, as shown in section (E) of FIG. 5, compared with the actual NOx concentration FNa indicated by the long dashed double-short dashed line, the increase in the actual NOx concentration FN in the exhaust gas is limited. That is, the controller 60 limits the deterioration of exhaust gas properties.

This embodiment can further achieve the following advantages.

(1) Even if the upper limit injection amount QFL is set, deterioration in exhaust gas properties may be unable to be sufficiently limited due to factors such as the aging of the properties of the internal combustion engine 10. When the NOx concentration difference ΔFN is greater than or equal to the concentration difference threshold value ΔFNth, he controller 60 corrects the relationship between the actual load factor KL and the upper limit injection amount QFL such that the upper limit injection amount QFL decreases. The upper limit injection amount QFL corresponds to the actual load factor KL. In the present embodiment, the load factor map shown in FIG. 3 is corrected.

The upper injection amount QFL is set using the corrected load factor map. The target injection amount QFTr is set so as not to exceed the upper limit injection amount QFL. This allows the controller 60 to limit the deterioration of exhaust gas properties, even if the properties of the internal combustion engine 10 change over time.

MODIFICATIONS

The above embodiment may be modified as follows. The above embodiment and the following modifications can be combined as long as the combined modifications remain technically consistent with each other.

In the above embodiment, the offset value Δα used for updating the map correction coefficient α remains constant regardless of the magnitude of the NOx concentration difference ΔFN. However, such a configuration does not have to be employed. For example, as the NOx concentration difference ΔFN increases, a larger offset value Δα may be set.

The internal combustion engine in which the controller 60 is employed does not have to include the forced-induction device 40.

The controller 60 is not limited to a device that includes a CPU and a ROM and executes software processing. That is, the controller 60 may be modified as long as it has any one of the following configurations (a) to (c).

(a) The controller includes one or more processors that execute various processes in accordance with a computer program. The processor includes a CPU and a memory, such as a RAM and ROM. The memory stores program codes or instructions configured to cause the CPU to execute the processes. The memory, or a computer-readable medium, includes any type of media that are accessible by general-purpose computers and dedicated computers.

(b) The controller includes one or more dedicated hardware circuits that execute various processes. Examples of the dedicated hardware circuits include an application specific integrated circuit (ASIC) and a field programmable gate array (FPGA). ASIC is an abbreviation of "Application Specific Integrated Circuit", and FPGA is an abbreviation of "Field Programmable Gate Array".

(c) The controller includes a processor that executes part of various processes in accordance with a computer program and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for an internal combustion engine, the controller comprising processing circuitry employed in the internal combustion engine using hydrogen as fuel, and the internal combustion engine including a fuel injection valve, wherein the processing circuitry is configured to execute operations to control the fuel injection amount of the fuel injection valve, the operations including:

calculating, based on a requested torque of the internal combustion engine, a base value of the fuel injection amount, the requested torque being a requested value of torque for the internal combustion engine;

setting a smaller one of the base value and an upper limit value of the fuel injection amount as a target value of the fuel injection amount, the upper limit value corresponding to an engine load factor of the internal combustion engine;

actuating the fuel injection valve based on the target value;

obtaining a NOx concentration difference between a NOx concentration in exhaust gas of the internal combustion engine and a reference value for the NOx concentration; and when the NOx concentration difference is greater than or equal to a concentration difference threshold value, correcting a relationship between the engine load factor and the upper limit value such that the upper limit value decreases.

2. The controller for the internal combustion engine according to claim 1, wherein the internal combustion engine includes a forced-induction device.

3. The controller for the internal combustion engine according to claim 1, wherein the processing circuitry is configured to correct the relationship between the engine load factor and the upper limit value such that the upper limit value decreases by changing a relationship between an air excess ratio and an actual load factor, the actual load factor indicating an actual value of the engine load factor.

4. The controller for the internal combustion engine according to claim 3, wherein the processing circuitry is configured to correct the relationship between the engine load factor and the upper limit value such that the upper limit value decreases by increasing the air excess ratio.

5. The controller for the internal combustion engine according to claim 1, wherein the processing circuitry is configured to correct the relationship between the engine load factor and the upper limit value when a duration during which the NOx concentration difference remains greater than or equal to a concentration difference threshold value is greater than or equal to a predetermined period of time.

6. A method for controlling an internal combustion engine, the method being executed by processing circuitry employed in the internal combustion engine using hydrogen as fuel, and the internal combustion engine including a fuel injection valve, wherein to control a fuel injection amount of the fuel injection valve, the method comprises:

calculating, based on a requested torque of the internal combustion engine, a base value of the fuel injection amount, the requested torque being a requested value of torque for the internal combustion engine, and an upper limit value of the fuel injection amount corresponding to an engine load factor of the internal combustion engine;

setting a smaller one of the upper limit value and the base value as a target value of the fuel injection amount;

actuating the fuel injection valve based on the target value;

obtaining a NOx concentration difference between a NOx concentration in exhaust gas of the internal combustion engine and a reference value for the NOx concentration; and when the NOx concentration difference is greater than or equal to a concentration difference threshold value, correcting a relationship between the engine load factor and the upper limit value such that the upper limit value decreases.

* * * * *